United States Patent
Jwania et al.

(10) Patent No.: US 9,764,682 B2
(45) Date of Patent: Sep. 19, 2017

(54) SYSTEMS AND METHODS FOR VEHICLE LIGHTING

(71) Applicant: MLS Automotive Inc., Farmington Hills, MI (US)

(72) Inventors: Ahmad Sameh Jwania, Bloomfield Hills, MI (US); Favian de Lima, Farmington Hills, MI (US)

(73) Assignee: MLS Automotive Inc., Farmington Hills, MI (US)

( * ) Notice: Subject to any disclaimer, the term of this patent is extended or adjusted under 35 U.S.C. 154(b) by 0 days.

(21) Appl. No.: 14/847,952

(22) Filed: Sep. 8, 2015

(65) Prior Publication Data

US 2017/0066366 A1 Mar. 9, 2017

(51) Int. Cl.
*B60Q 1/14* (2006.01)
*H05B 33/08* (2006.01)
*B60Q 1/04* (2006.01)

(52) U.S. Cl.
CPC .............. *B60Q 1/1415* (2013.01); *B60Q 1/04* (2013.01); *H05B 33/083* (2013.01); *H05B 33/0812* (2013.01); *H05B 33/0815* (2013.01)

(58) Field of Classification Search
CPC .............. H05B 33/0815; H05B 33/083; H05B 33/0845; B60Q 1/04; B60Q 1/1415
USPC ...................................................... 315/77, 82
See application file for complete search history.

(56) References Cited

U.S. PATENT DOCUMENTS

| | | | |
|---|---|---|---|
| 6,137,816 A | 10/2000 | Kinbara | |
| 6,239,716 B1 | 5/2001 | Pross et al. | |
| 6,570,505 B1 | 5/2003 | Malenfant | |
| 7,202,608 B2 | 4/2007 | Robinson et al. | |
| 7,710,050 B2 | 5/2010 | Preston et al. | |
| 8,659,237 B2 | 2/2014 | Archenhold | |
| 2004/0075393 A1* | 4/2004 | Ito | H05B 33/0845 315/77 |
| 2008/0018261 A1 | 1/2008 | Kastner | |
| 2012/0181931 A1 | 7/2012 | Katsura | |
| 2013/0320850 A1* | 12/2013 | Nakamura | F21S 48/1747 315/82 |
| 2014/0184080 A1* | 7/2014 | Rybicki | H05B 33/0845 315/122 |
| 2015/0069909 A1* | 3/2015 | Suganuma | H05B 33/089 315/82 |

FOREIGN PATENT DOCUMENTS

DE 102011079473 1/2013

* cited by examiner

*Primary Examiner* — Tung X Le
(74) *Attorney, Agent, or Firm* — Foley & Lardner LLP

(57) ABSTRACT

A vehicle lighting system includes a first LED, a second LED, a mode switch controller, and an electronic switch. The first LED is electrically connected in series with the second LED. The mode switch controller is electrically connected to each of the first and second LEDs. The electronic switch is electrically connected to the mode switch controller between the first and second LEDs. The electronic switch is configured to short circuit the second LED in a primary mode, and to remove the short circuit in a secondary mode. The mode switch controller is configured to control the electronic switch to short circuit the second LED in the first mode, receive an input indicative of the secondary mode from a vehicle controller, and in response, control the electronic switch to remove the short circuit.

18 Claims, 9 Drawing Sheets

SYSTEMS AND METHODS FOR VEHICLE LIGHTING

BACKGROUND

The present application relates generally to the field of vehicle lighting. More specifically, the present application relates to systems and methods for vehicle lighting including a single channel, dual mode switch power supply for controlling two independent light sources.

Generally speaking, vehicle lighting systems, such as automotive headlamps and taillights, can include one or more LED light sources to provide both low intensity and high intensity lighting functions (sometimes referred to as a dual mode function). Typically, the low intensity and high intensity functions are controlled using a current regulator, such as an electronics driver based on a switch mode power supply (SMPS), which can regulate an output current to a series of LEDs. However, because of the dual mode design, a dual channel driver is usually required to control the low intensity and high intensity functionality. The use of a dual channel driver can require an increase in electrical component count, overall system complexity, and potential component failures due to the number of electrical components required in the circuit.

Additionally, in a typical dual mode application with a dual channel driver, both channels are not operating at exactly the same frequency, and therefore, are not necessarily operating in sync. This can ultimately lead to electromagnetic compatibility issues, because of the difference in ON and OFF times for the switching components of the dual channel driver.

SUMMARY

One aspect relates to a vehicle lighting system. The vehicle lighting system includes a first LED, a second LED, a mode switch controller, and an electronic switch. The first LED is electrically connected in series with the second LED. The mode switch controller is electrically connected to the first and second LEDs. The electronic switch is electrically connected to the mode switch controller between the first and second LEDs. The electronic switch is configured to short circuit the second LED in a primary mode, and to remove the short circuit in a secondary mode. The mode switch controller is configured to control the electronic switch to short circuit the second LED in the first mode, receive an input indicative of the secondary mode from a vehicle controller, and in response, control the electronic switch to remove the short circuit.

Another aspect relates to a method for controlling a vehicle lighting system. The method includes providing a vehicle lighting system. The vehicle lighting system includes a first LED electrically connected in series with a second LED, a mode switch controller electrically connected to the first and second LEDs, and an electronic switch electrically connected to the mode switch controller between the first and second LEDs. The method further includes operating the electronic switch to short circuit the second LED in a first mode. Receiving, by the mode switch controller, an input from a source. And in response to receiving the input, operating the electronic switch by the mode switch controller to remove the short circuit in a second mode to allow the second LED to receive an electric current.

In some implementations, the primary mode is a low beam lighting function, and the secondary mode is a high beam lighting function. In some implementations, the input is an electronic signal sent from a vehicle controller to control a high beam lighting function, and the electronic switch is at least one of a MOSFET or a BJT. In some implementations, the mode switch controller includes a transistor configured to turn off the electronic switch to remove the short circuit in response to receiving the input.

In some implementations, during the primary mode, the first LED receives an electric current from a constant current source and the second LED does not receive an electric current, and during the secondary mode, both the first and second LEDs receive an electric current from the constant current source. In some implementations, the system further comprises a controller configured to automatically adjust an output voltage to maintain a desired output current delivered to the second and/or first LEDs in response to a change between modes. In some implementations, the system further comprises a current limiting element electrically connected in series with the electronic switch. In some implementations, the current limiting element is at least one of a resistor or an inductor.

In some implementations, the system further comprises a signal generator and a controller. The signal generator is electrically connected to the system so as to detect a change from the secondary mode to the primary mode. The controller is electrically connected to the signal generator. The signal generator and the controller are configured to reduce a voltage drop on the electronic switch in response to detecting a change from the secondary mode to the primary mode.

In some implementations, the signal generator is configured to reduce the voltage drop by generating a control signal to reduce an amount of power provided to the first LED for a period of less than about 16.6 milliseconds. In some implementations, the signal generator is one of a pulse width modulated or an analog input for generating the control signal to reduce the amount of power provided to the first LED.

BRIEF DESCRIPTION OF THE DRAWINGS

The above and related objects, features, and advantages of the present disclosure will be more fully understood by reference to the following detailed description, when taken in conjunction with the following figures, wherein.

DETAILED DESCRIPTION

Aspects and implementations of the present disclosure relate generally to vehicle lighting systems including a single channel SMPS and a mode controller for controlling a dual mode lighting function, such as a low beam and a high beam lighting function. In this way, the disclosed systems eliminate the need for a dual channel driver, thereby improving system reliability while reducing electrical component count, system complexity, and electromagnetic compatibility issues.

Figure 1A:
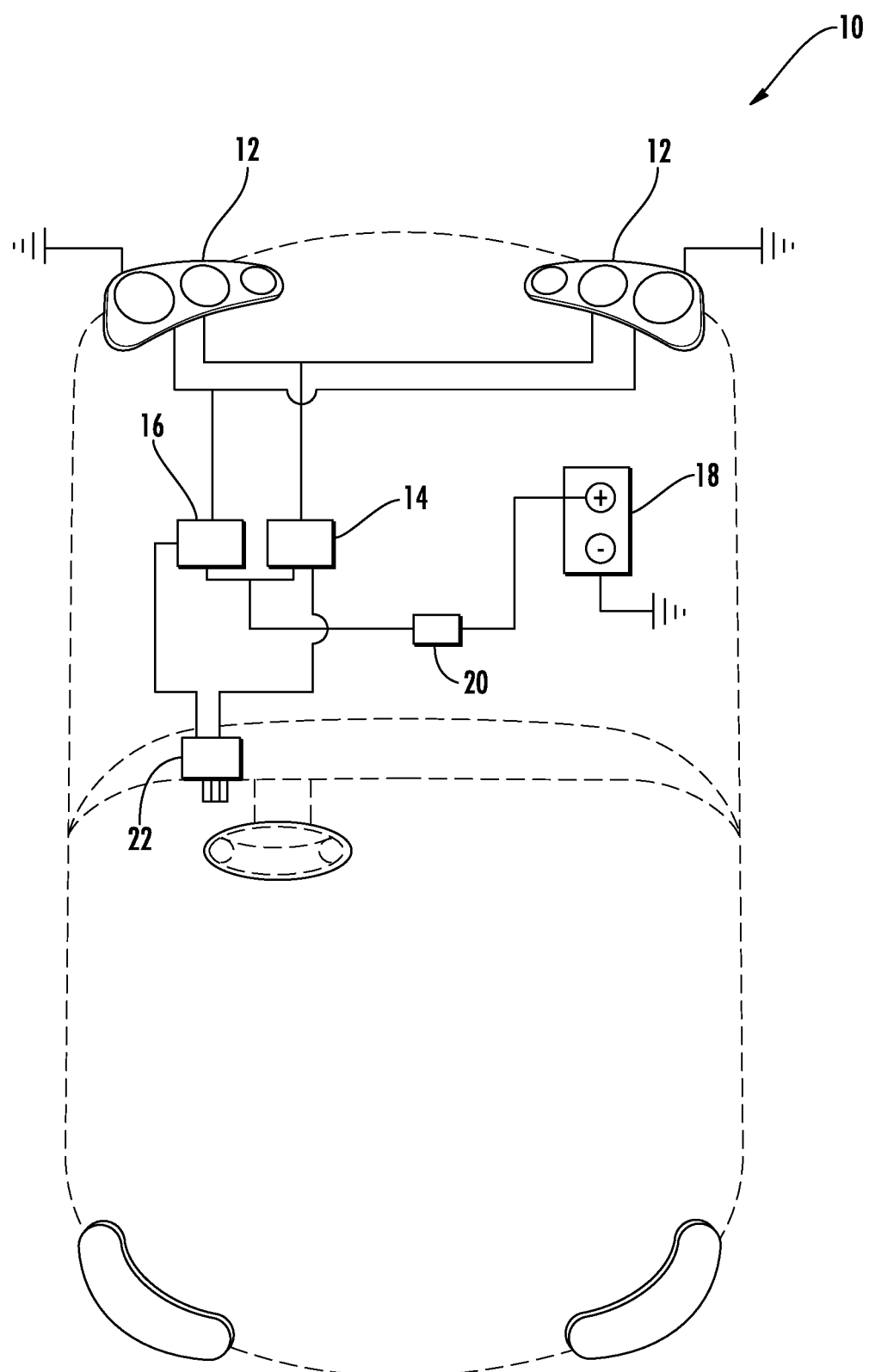
FIG. 1A is a top view of an automobile including a vehicle lighting system according to one implementation.

Referring to FIG. 1A, a vehicle is shown as an automobile 10 including a vehicle lighting system according to one implementation. Although the vehicle is shown as an automobile in the implementation of FIG. 1A, in other implementations the vehicle can be a boat, a plane, a truck, or the like. As shown in FIG. 1A, the automobile 10 includes a pair of headlamp modules 12. Each of the headlamp modules 12 forms part of the vehicle lighting system. Each of the headlamp modules 12 includes a single channel SMPS and a mode controller for providing both a low beam and a high beam lighting function for the automobile 10. The details of the vehicle lighting system including the single channel SMPS and the mode controller are discussed further in the paragraphs that follow. Each of the headlamp modules 12 is electrically connected to a vehicle controller shown as a headlamp switch 22 located, for example, within an interior of the automobile 10. The headlamp switch 22 can allow a user to control both a low beam and a high beam lighting function for each of the headlamp modules 12. According to other implementations, the automobile 10 includes separate switches for controlling the low beam and the high beam lighting functions, respectively.

In the implementation shown in FIG. 1A, each of the headlamp modules 12 and the headlamp switch 22 is connected in parallel to a low beam switch 14 and a high beam switch 16. In some implementations, the low beam switch 14 and the high beam switch 16 are electromechanical switches, such as relays. In other implementations, the low beam switch 14 and the high beam switch 16 are semiconductor switches, such as FETs. The switches 14 and 16 can receive a small electric current from the headlamp switch 22 to control either a low beam or a high beam lighting function of the headlamp modules 12. In response to receiving the small electric current from the headlamp switch 22, the switches 14 and 16 can provide an electric current to each of the headlamp modules 12 that is sufficient to operate either a low beam or a high beam lighting function, respectively. The automobile 10 further includes a power source shown as a battery 18 electrically connected to each of the switches 14 and 16 to provide power thereto. The battery 18 can provide power sufficient to enable each of the switches 14 and 16 to provide the necessary electric current to operate the low beam and the high beam lighting functions of the headlamp modules 12. In some implementations, a fuse 20 can be coupled between the battery 18 and the switches 14 and 16 to protect each of the switches.

Figure 1B:
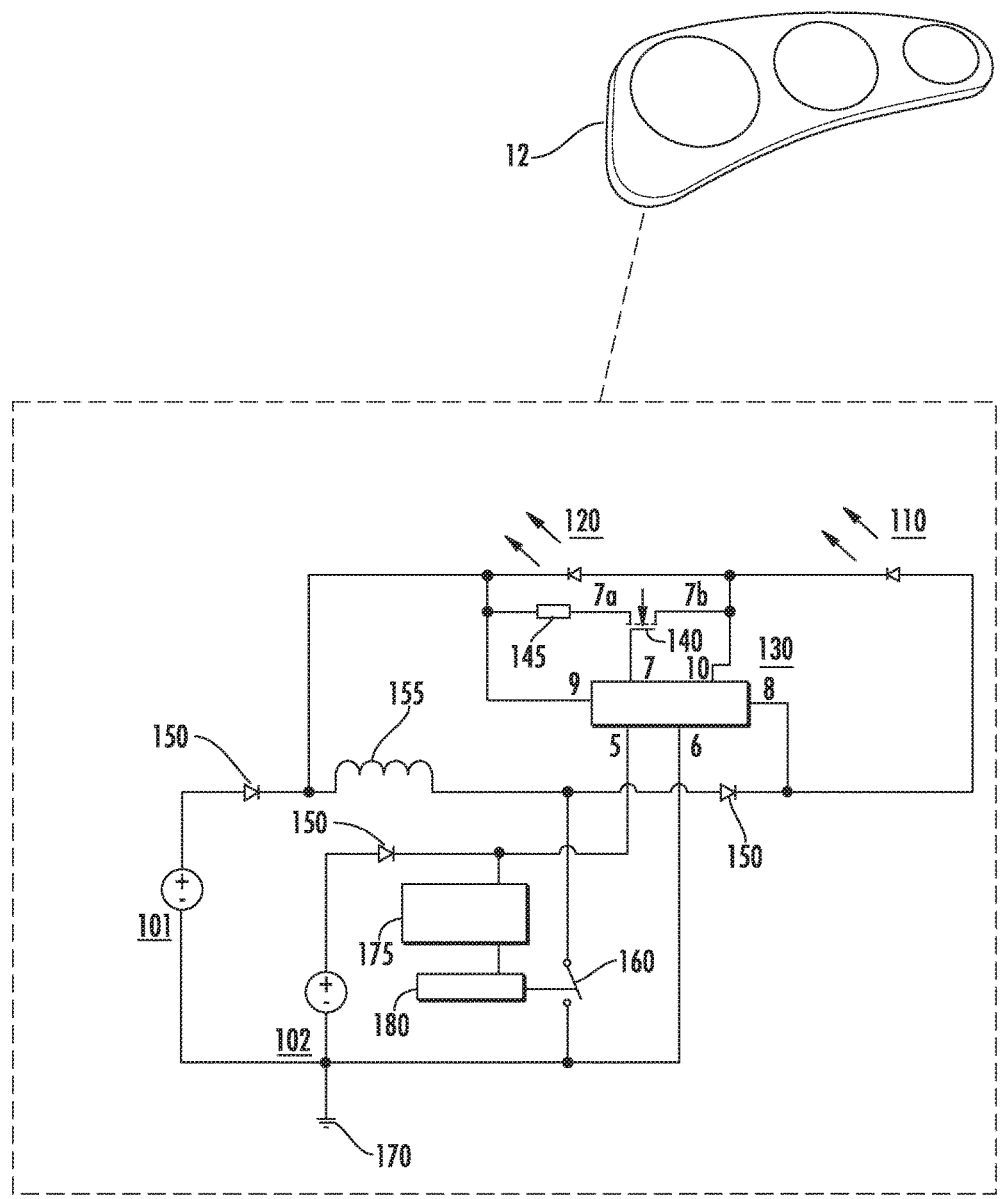
FIG. 1B is a schematic representation of a vehicle lighting system according to one implementation.

FIG. 1B is a schematic representation of a vehicle lighting system for use in the automobile 10 of FIG. 1A according to one implementation. In some implementations, the vehicle lighting system can be packaged within a vehicle lighting module, such as in the headlamp module 12 of FIG. 1A. The vehicle lighting system is shown as a circuit 100 in FIG. 1B, and includes a set of series connected LEDs ("primary LEDs 110") to provide low beam lighting and another set of series connected LEDs ("secondary LEDs 120") to provide high beam lighting. Further, the primary LEDs 110 are connected in series with the secondary LEDs 120. In one implementation, the primary LEDs 110 are generally associated with a first mode of operation, such as a low beam or primary lighting mode. The secondary LEDs 120 are generally associated with a second mode of operation, such as a high beam or secondary lighting mode. The circuit 100 also includes, a primary input 101, an inductor 155, a switch 160, and a switch controller 180. The primary input 101, the inductor 155, the switch 160, and the switch controller 180 collectively define an SMPS for providing power to the primary LEDs 110 and the secondary LEDs 120. The electrical circuit 100 also includes a mode switch controller 130 for controlling a mode switch 140 connected in parallel with the secondary LEDs 120. In various implementations, the mode switch controller 130 can control the mode switch 140 to provide a primary, low beam mode lighting function, or a secondary, high beam mode lighting function.

The electrical circuit 100 further includes a secondary input 102 for providing a mode signal to the mode switch controller 130. The mode signal can indicate a primary or a secondary lighting function. In some implementations, the mode signal is an electric current received from a switch and/or a vehicle controller (e.g., a headlamp switch, etc.). For example, in the implementation shown in FIG. 1A, the mode signal is an electric current received from the high beam switch 16 and the battery 18 in response to a high beam control signal sent from the headlamp switch 22. The circuit 100 can also include a mode detection module 175 for detecting a mode change and for providing a control signal to the switch controller 180 to alter the SMPS output based on the mode change. The circuit 100 can also include one or more reverse protection diodes 150 for reverse current protection. Each of the above mentioned components of the circuit 100 is described in detail below. In the implementation shown in FIG. 1B, the SMPS is configured in a BUCK-BOOST topology. However, other SMPS topologies can also be utilized as discussed further below.

In one implementation, the primary input 101 can be a constant current source, such as a switch and/or a vehicle controller (e.g., a headlamp switch, etc.). For example, in the implementation shown in FIG. 1A, the primary input 101 is an electric current received from the low beam switch 14 and the battery 18 in response to a low beam input signal sent from the headlamp switch 22. In other implementations, the primary input 101 can be a constant voltage source. The primary input 101 can provide an electric current and an electrical voltage sufficient for operating the primary LEDs 110 and the secondary LEDs 120. In one implementation, the secondary input 102 can also be a voltage source for providing a mode signal. In the implementation shown in FIG. 1A, the secondary input 102 can be an electric current sent from the high beam switch 16 and the battery 18 in response to a high beam control signal sent from the headlamp switch 22. The high beam control signal can control a secondary or high beam mode lighting function of, for example, the headlamp modules 12 of FIG. 1A. In some implementations, the primary input 101 and the secondary input 102 are sent from a common source, such as the headlamp switch 22 shown in FIG. 1A. In other implementations, the secondary input 102 is received from a source that is different from the source for the primary input 101, such as from a different vehicle controller or switch.

As mentioned above, the mode switch 140 is controlled by the mode switch controller 130. In one implementation, the mode switch 140 can be implemented by a MOSFET. In other implementations, the mode switch 140 can be implemented by a BJT. In the implementation of FIG. 1, the mode switch 140 can operate in a first mode of operation, such as a primary or low beam lighting mode. In this mode, the mode switch 140 is switched ON, resulting in bypassing or short circuiting the secondary LEDs 120. In this way, the secondary LEDs 120 do not receive an electric current, and therefore, do not illuminate. Instead, only the primary LEDs 110 receive an electric current from the primary input 101, thereby providing a low beam or primary mode lighting function.

In some implementations, the electrical circuit 100 further includes a current limiting element 145 electrically connected in series with the mode switch 140. In some implementations, the current limiting element 145 is a resistor. In other implementations, the current limiting element 145 is an inductor. In other implementations, the current limiting element 145 is another type of electrical component capable of limiting an electric current flowing along the electrical circuit 100. In various implementations, the current limiting element 145 can protect the mode switch 140 by limiting the amount of electrical current flowing through the mode switch 140. In addition, the current limiting element 145 can help to improve the stability of the electrical circuit 100. In one implementation, the current limiting element 145 has a minimum resistance value of about 0.2 ohms. In other implementations, the current limiting element 145 can have a resistance in the range of between about 0 ohm and about 10 ohms.

In various implementations, the mode switch 140 can be switched OFF by the mode switch controller 130 when the mode switch controller 130 receives an electronic signal indicative of a secondary or high beam lighting mode. In one implementation, the signal sent to the mode switch controller 130 is from the secondary input 102. In response to receiving the signal, the mode switch controller 130 can switch OFF the mode switch 140 so as to remove the short circuit across the secondary LEDs 120, thereby allowing the electric current to flow through both the primary LEDs 110 and the secondary LEDs 120. In this way, both the primary LEDs 110 and the secondary LEDs 120 can receive an electric current from the primary input 101, thereby providing a high beam or secondary mode lighting function.

As mentioned above, the electrical circuit 100 also includes one or more reverse protection diodes 150 located along various electrical paths of the electrical circuit 100. In the implementation shown, reverse protection diodes 150 are positioned in series between the primary input 101 and the inductor 155, and between the inductor 155 and the primary LEDs 110. Another reverse protection diode 150 is positioned between the secondary input 102 and the mode switch controller 130. The reverse protection diodes 150 can help to prevent an electrical current from flowing in a reverse direction within the electrical circuit 100, such as through the primary and secondary LEDs 110 and 120.

As mentioned above, the primary input 101, the inductor 155, the switch 160, and the switch controller 180 can collectively define an SMPS for providing power to the primary LEDs 110 and the secondary LEDs 120. In some implementations, the switch 160 can be implemented by a transistor switch, for example, a MOSFET and/or a BJT. The switch 160 can be switched ON to allow the current to flow through the primary input 101, the inductor 155 and the switch 160, thereby energizing the inductor 155. When the switch 160 is switched OFF, the inductor 155 can provide power to the primary LEDs 110 and the secondary LEDs 120. The switch 160 can be switched ON and OFF in repeated cycles (also known as commutation cycles), in order to provide power. The relative time for which the switch 160 is switched ON and OFF (also known as a duty cycle) can be adjusted to adjust the amount of power provided to the primary LEDs 110 and the secondary LEDs 120.

The controller 180 can provide a control signal for switching the switch 160 ON and OFF. The controller can include a signal generator for generating a ON/OFF control signal to be provided to the switch 160. In some implementations, the signal generator can generate pulse-width-modulated (PWM) control signal that swings between two voltages, which when provided to the switch 160 causes the switch 160 to switch between ON and OFF states corresponding to the two voltages. In some implementations, the signal generator can control the duty cycle of the PWM control signal to adjust the ON time relative to the OFF time of the switch 160. In some implementations, the duty cycle can be based on the desired output power of the SMPS. The signal generator can increase the duty cycle if the desired power output increases, and decrease the duty cycle when the desired power output decreases. In some implementations, the controller 180 can store in memory preset duty cycle values, which can be used by the signal generator to generate the appropriate PWM control signals. In some other implementations, the controller 180 can receive duty cycle values externally, based on which the signal generator can generate the appropriate PWM control signal. In yet other implementations, the controller can receive analog or digital signals indicating the desired output power. In some such implementations, the controller 180 can determine the duty cycle value based on the received analog or digital signal. In some implementations, the controller 180 scan receive a feedback signal indicating the power output of the SMPS, and can adjust the duty cycle of the PWM control signal based on the comparison between the desired power output and the power output indicated by the feedback signal, such that the power output indicated by the feedback signal approaches the desired power output.

In some implementations, the mode detection module 175 and the controller 180 can be used to improve the stability of the electrical circuit 100 when the lighting mode switches from a high beam lighting mode to a low beam lighting mode. In particular, the mode detection module 175 and the controller 180 can be used to stabilize the electrical circuit 100 against sudden changes in the LED load seen by the SMPS when switching from high beam to low beam lighting modes. As discussed above, in high beam lighting mode, the mode switch 140 is in the OFF state, resulting in a current flow through the primary LEDs 110 and the secondary LEDs 120. When the operation switches to low beam light mode, the mode switch 140 is switched ON, causing the current not to flow through the secondary LEDs 120. This results in a sudden reduction in the LED load as seen by the SMPS. In some implementations, the sudden reduction in LED load can destabilize the SMPS. The mode detection module 175 can detect a change in the lighting mode by sensing the output of the secondary input 102 and, upon detecting a signal to change the lighting mode to low beam, provides a signal to the controller 180 to reduce the power provided to the LEDs, such that the change in the lighting mode is carried out at low or zero power, thereby reducing the risk of destabilizing the SMPS.

Figure 7:
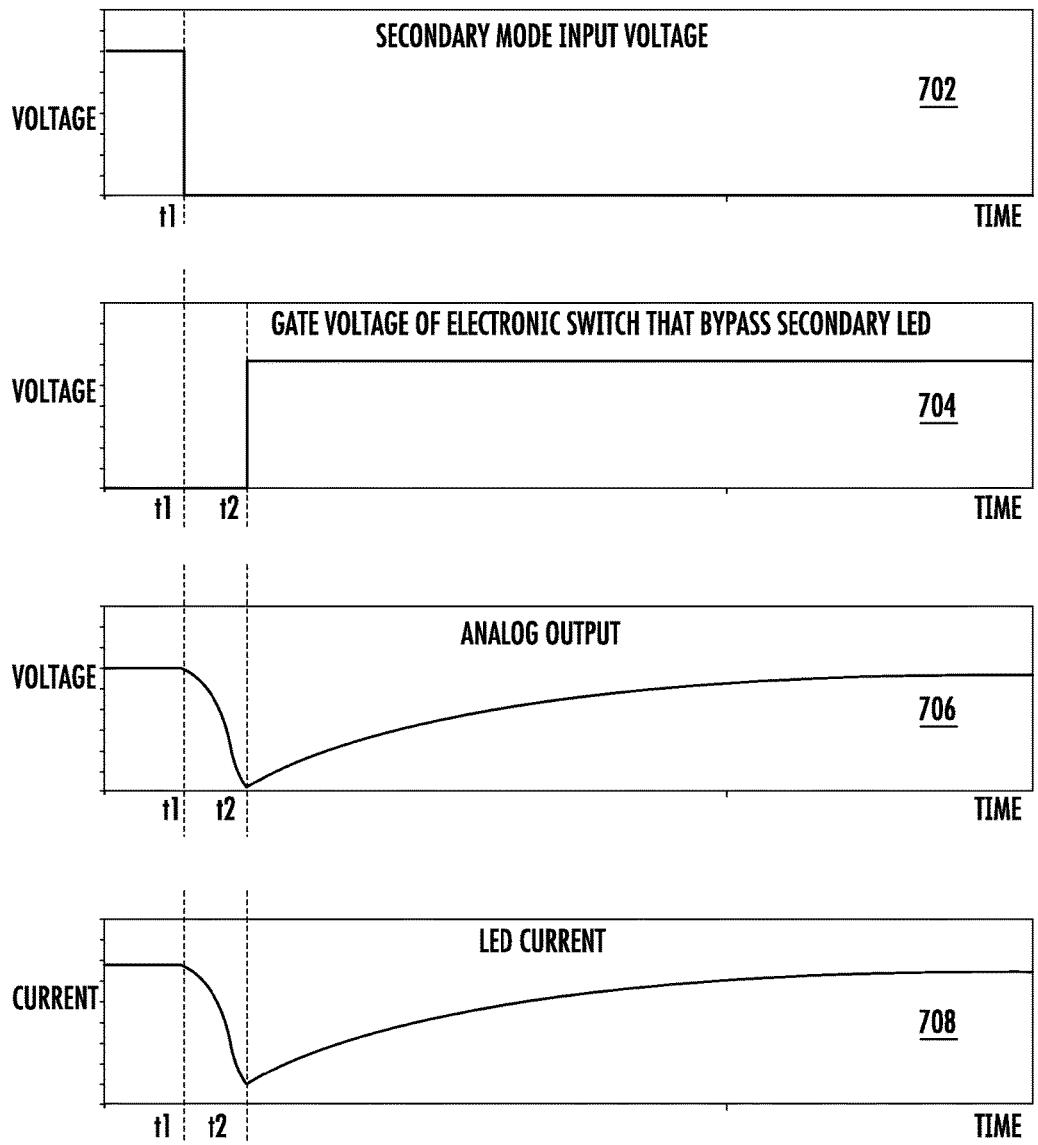
FIG. 7 is a voltage and current plot of a vehicle lighting system according to one implementation.

FIG. 7 illustrates a voltage and current plot for various components of the electrical circuit 100 during a change from a secondary, high beam lighting mode to a primary, low beam lighting mode. In particular, FIG. 7 shows a secondary input output voltage waveform 702 indicating the output voltage of the secondary input 102, a mode switch gate voltage waveform 704 indicating the gate voltage at the gate terminal of the mode switch 140, a mode detection module output voltage waveform 706 indicating the output of the mode detection module 175 provided to the controller 180, and a LED current waveform 708 indicating the current flowing through the LEDs. Time $t_1$ indicates the instant when the secondary input 102 reduces its output voltage to indicate a change in the lighting mode from high beam to low beam, and time $t_2$ indicates the instant when the mode switch controller 130 increases the voltage on the gate terminal of the mode switch 140, in response to the reduction in the output voltage of the secondary input 102.

Referring to both FIGS. 1B and 7, at time $t_1$, the mode detection module 175 detects the reduction in the output of the secondary input 102 (waveform 702), and in response begins to reduce the output voltage provided to the switch controller 180 (waveform 706). The output voltage provided to the controller 180 by the mode detection module 175 indicates the current to be output by the SMPS. The controller 180, in response to the decreasing magnitude control signal from the mode detection module 175, adjusts the duty cycle of the PWM signal provided to the switch 160, such that the current output of the SMPS is reduced proportionally (waveform 708). The output voltage provided to the controller 180 approaches zero by time $t_2$. Proportionally, the LED current also approaches zero by time $t_2$. Thus, when at time $t_2$ the mode switch 140 switches ON, the switching occurs at zero current through the LEDs. As a result, the change in the LED load does not cause any change in the voltage drop across the LEDs, thereby reducing the risk of instability in the SMPS. After time $t_2$, the mode detection module 175 gradually increases the output voltage provided to the controller 180, which in turn adjusts the PWM control signal to the switch 160, such that the current output by the SMPS also gradually increases. This change in the SMPS output current may cause the primary LEDs 110 to dim or reduce in light intensity. In various implementations, the LED dimming occurs within a timeframe that is undetectable by the human visual system. In some implementations, the dimming occurs within a timeframe of less than about 1 millisecond. In some other implementations, the dimming occurs within a timeframe of about 16.6 milliseconds, which is a threshold time period for detecting a change in light intensity by the human visual system.

Figure 2:
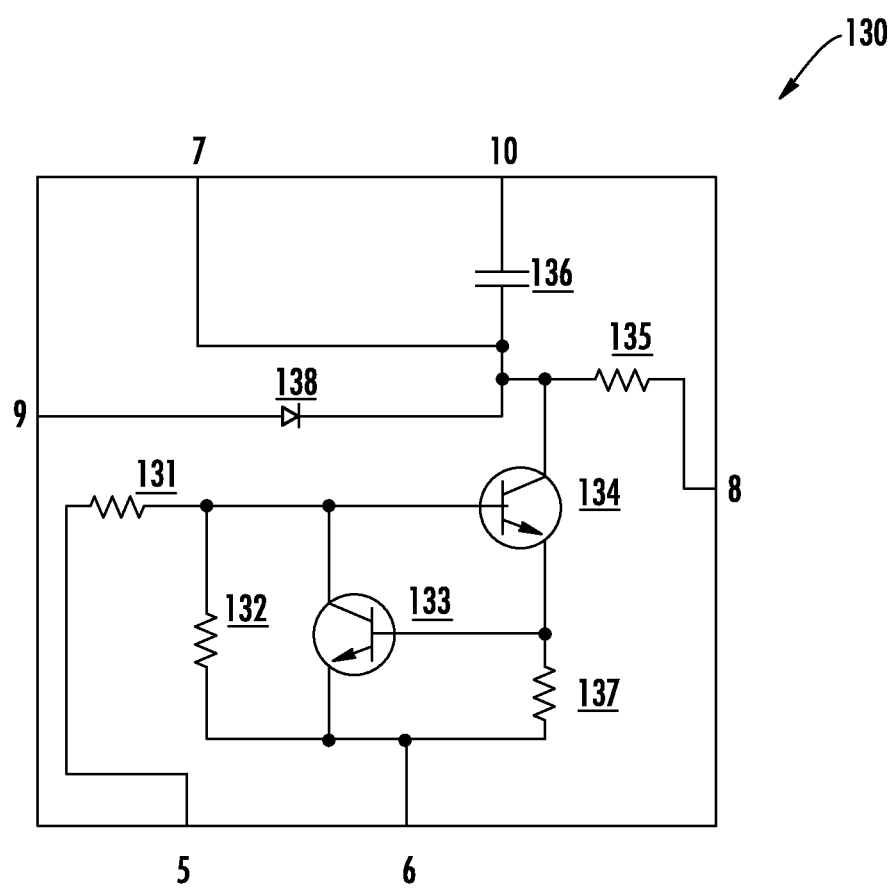
FIG. 2 is a schematic representation of a mode switch controller for use in the vehicle lighting system of FIG. 1.

FIG. 2 is a schematic representation of an example mode switch controller 130 for use in the vehicle lighting system of FIG. 1. In the implementation shown, the mode switch controller 130 includes a first transistor 133, a second transistor 134, a filter capacitor 136, a zener diode 138 and a first resistor 131, a second resistor 132, a third resistor 135 and a fourth resistor 137. The first transistor 133 and the second transistor 134 are connected in a back-to-back configuration, where the emitter of the second transistor is connected to the base of the first transistor 133, and the collector of the first transistor 133 is connected to the base of the second transistor 134. The base of the second transistor 134 is connected (at a terminal 5) to the secondary input 102 via the first resistor 131. The base of the second transistor 134 is also coupled to ground (at terminal 6) via the second resistor 132, while the base of the first transistor 133 is coupled to ground via the fourth resistor 137. The first resistor 131, the second resistor 132 and the fourth resistor 137 provide the required biasing voltages for the operation of the first transistor 133 and the second transistor 134. The collector of the second transistor 134 is connected to a first terminal of the third resistor 135, a first terminal of the filter capacitor 136, the cathode terminal of the zener diode 138, and to the gate terminal of the mode switch 140 (at terminal 7). The second terminal of the third resistor 135 is coupled to the cathode of the reverse protection diode 150 (at terminal 8). The second terminal of the filter capacitor 136 is connected to the first source/drain terminal of the mode switch, the cathode of the primary LEDs 110 and the anode of the secondary LEDs 120. The anode of the zener diode is connected to the current limiting element 145 and the cathode of the secondary LEDs 120. In some implementations, the filter capacitor 136 can provide filtering functionality by reducing the ripple in the voltage provided by the SMPS.

Referring to FIGS. 1 and 2, when the electrical circuit 100 is in the high beam lighting mode, the secondary input 102 outputs zero volts to the mode switch controller 130. Therefore, the base of the second transistor 134 receives zero volts, causing the second transistor 134 to switch OFF. The switching OFF of the second transistor 134 causes the voltage at the base of the first transistor 133 to be pulled down to ground or zero volts as well, causing the first transistor 133 to switch OFF. As there is no current path through the second transistor 134, the voltage at the cathode of the zener diode 138 rises. The breakdown voltage of the zener diode 138 can be selected to be a few volts above ground, such that when the voltage on the cathode of the zener diode 138 exceeds the breakdown voltage, the zener diode 138 begins to conduct in the reverse direction. This allows a current path from the terminal 8, through the third resistor 135 and the reverse biased zener diode 138 and to the inductor 155 via terminal 9. The voltage drop across the third resistor 135 and across the zener diode 138 provides a voltage to the gate terminal of the mode switch 140, which switches ON, causing the secondary LEDs 120 to be short circuited. As no current flows through the secondary LEDs 120, the secondary LEDs stop illuminating.

When the electrical circuit 100 switches from the low beam lighting mode to the high beam lighting mode, the secondary input 102 provides a high voltage to the mode switch controller 130. As a result, the base of the second transistor 134 receives a high voltage, causing the second transistor 134 to switch ON. As the second transistor 134 begins to conduct, the voltage at the collector of the second transistor 134 decreases. When the voltage at the collector of the second transistor 134 decreases below the reverse breakdown voltage of the zener diode 138, the zener diode 138 ceases to conduct. As the voltage at the collector of the second transistor 134 decreases further, the voltage provided to the gate of the mode switch 140 also decreases. As a result, the mode switch 140 switches OFF, causing the current to flow through the secondary LEDs 120.

Figure 3:
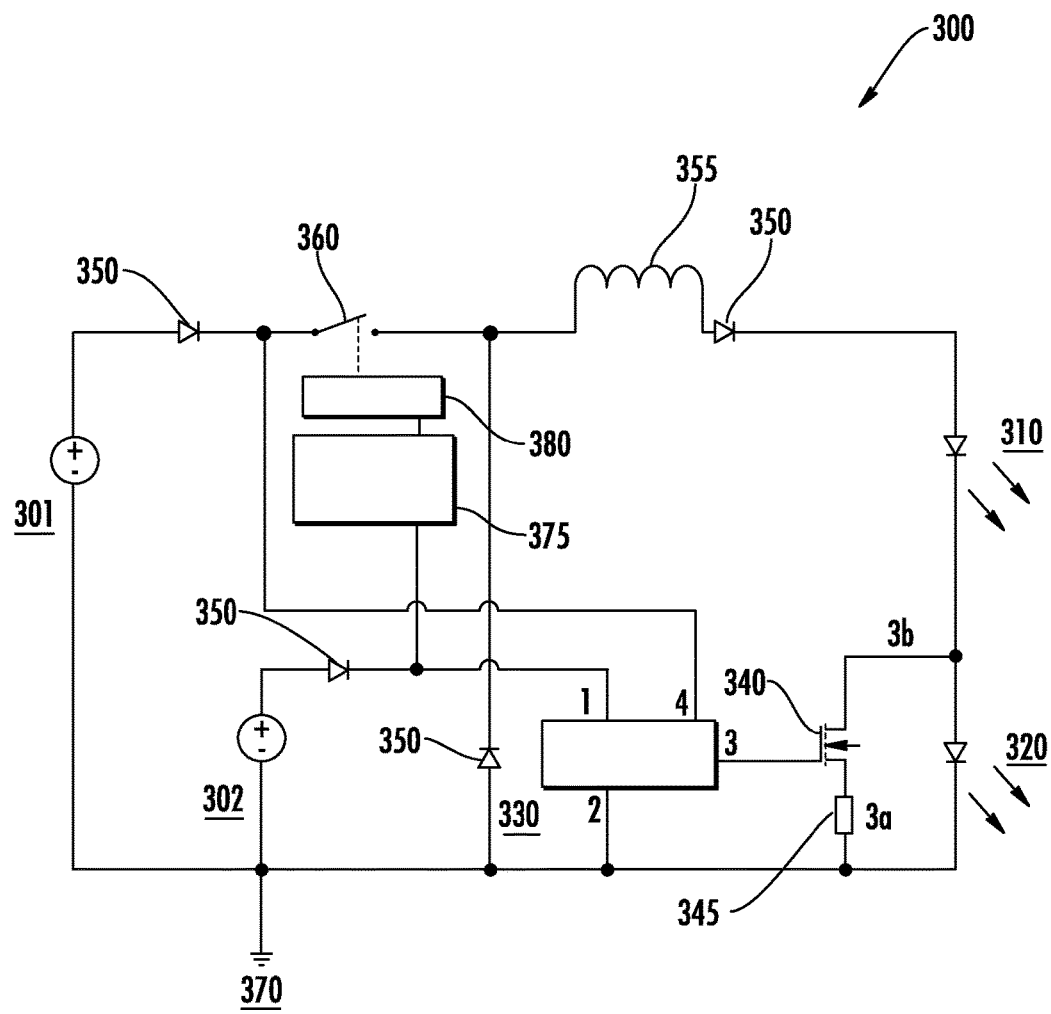
FIG. 3 is a schematic representation of a vehicle lighting system according to another implementation.
Figure 4:
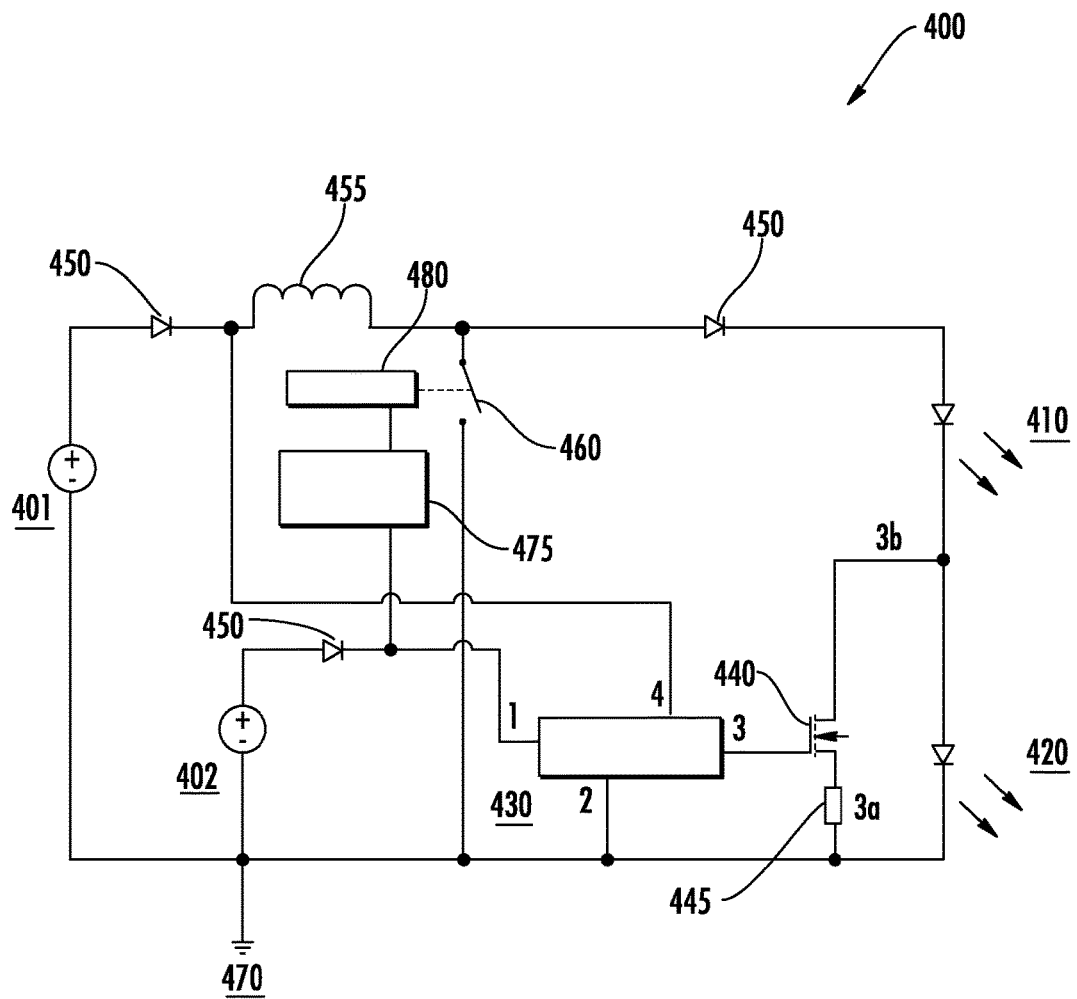
FIG. 4 is a schematic representation of a vehicle lighting system according to another implementation.
Figure 5:
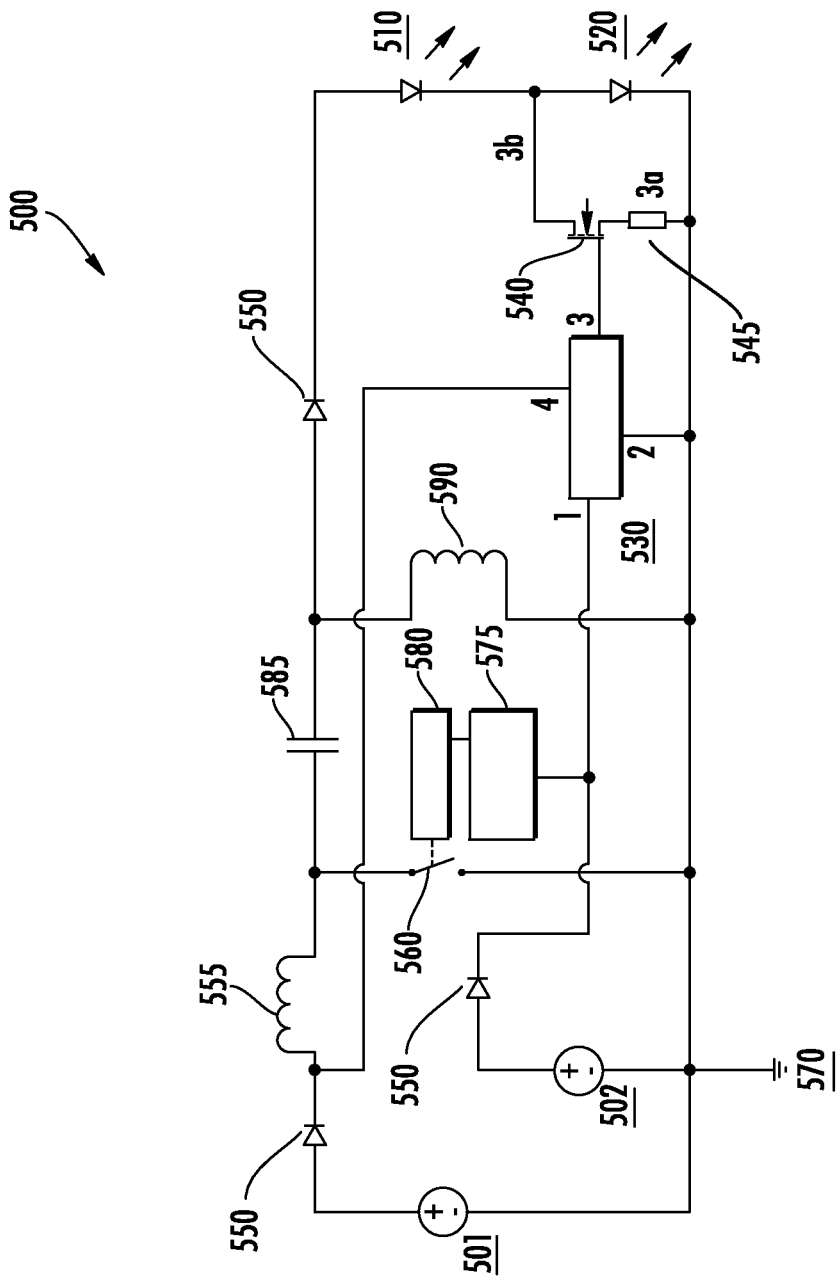
FIG. 5 is a schematic representation of a vehicle lighting system according to another implementation.

FIGS. 3-5 show schematic representations of various vehicle lighting systems having different electrical topologies according to various implementations. In each of the implementations shown, like reference numerals refer to identical components between figures, but are increased by different orders (e.g., primary LEDs 110 in FIG. 1 are primary LEDs 310 in FIG. 3, etc.). The basic function of the vehicle lighting systems of FIGS. 3-5 are identical to the function of the vehicle lighting system of FIG. 1 discussed above. That is to say, the mode switch controller (375 in FIG. 3, 475 in FIG. 4, and 575 in FIG. 5) of each of the implementations can receive an electronic signal from a secondary input (302 in FIG. 3, 402 in FIG. 4, and 502 in FIG. 5), indicative of a secondary mode or high beam mode lighting function. In response, the mode switch controller can operate a mode switch (340 in FIG. 3, 440 in FIG. 4, and 550 in FIG. 5) to remove a short circuit across the secondary LEDs (320 in FIG. 3, 420 in FIG. 4, and 520 in FIG. 5), thereby allowing both the primary LEDs (310 in FIG. 3, 410 in FIG. 4, and 510 in FIG. 5) and the secondary LEDs to receive an electric current from a primary input (301 in FIG. 3, 401 in FIG. 4, and 501 in FIG. 5). When the mode switch controller no longer receives the electronic signal from the secondary input, the mode switch controller can control the electronic switch to short circuit the secondary LEDs, thereby providing a low beam or primary mode lighting function.

According to one implementation shown in FIG. 3, a vehicle lighting system is shown schematically as an electrical circuit 300 with a BUCK topology. This implementation can allow the vehicle lighting system to be used in an environment where the output voltage of the circuit is less than the power supply voltage.

According to another implementation shown in FIG. 4, a vehicle lighting system is shown schematically as an electrical circuit 400 having a BOOST topology. This implementation can allow the vehicle lighting system to be used in an environment where the output voltage of the circuit is greater than the power supply voltage.

According to another implementation shown in FIG. 5, a vehicle lighting system is shown schematically as an electrical circuit 500 having a SEPIC topology. This implementation is similar to the implementation of FIG. 1, but can allow the vehicle lighting system to be used in an environment where it is desirable to control an output voltage of the circuit to be greater than, less than, or equal to the power supply voltage.

Figure 6:
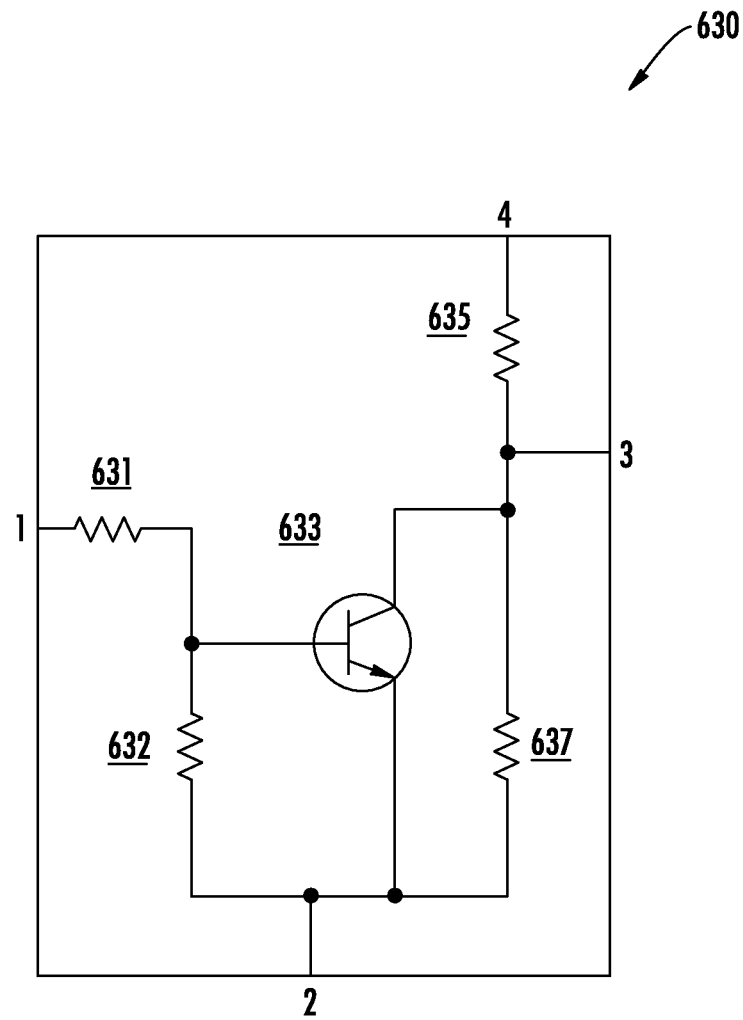
FIG. 6 is a schematic representation of a mode switch controller for use in the vehicle lighting systems of FIGS. 3-5.

FIG. 6 is a schematic representation of a mode switch controller 630 for use in the vehicle lighting systems of FIGS. 3-5. While the following discussion describes the mode switch controller 630 in relation to the electrical circuit 300 of FIG. 3, it is understood that the mode switch controller 630 would operate in a similar manner when employed in the electrical circuits 400 and 500 shown in FIGS. 4 and 5, respectively. The mode switch controller 630 includes a third transistor 633, a sixth resistor 631, a seventh resistor 632, an eighth resistor 635 and a ninth resistor 637. The seventh resistor 632 is connected between the base and the emitter of the third transistor 633, while the ninth resistor 637 is connected between the collector and the emitter of the third transistor 633. The emitter of the third transistor 633 is connected to ground (at terminal 2), the base of the third transistor 633 is connected to the secondary input 302 via the sixth resistor 631 (at terminal 1), and the collector of the third transistor 633 is connected to the gate terminal of the mode switch 340 (at terminal 3) and to the circuit node connecting the cathode of a reverse protection diode 350 and a switch 360 (at terminal 4). The sixth resistor 631, the seventh resistor 632, the eighth resistor 635 and the ninth resistor 637 can provide appropriate biasing voltages for the operation of the third transistor 633.

In a high beam lighting mode, the mode switch controller 330 receives a high voltage from the secondary input 302 (this is in contrast with the electrical circuit 100 in which the high beam lighting mode was indicated by a low voltage from the secondary input 102). As a result, the base of the third transistor 633 receives a high voltage, causing the third transistor 633 to switch ON, which in turn causes the voltage at the collector, and the voltage provided to the mode switch 340, to decrease. This decrease in the voltage provided to the gate terminal of the mode switch 340 causes the mode switch to switch OFF. As the mode switch 340 is switched OFF, the mode switch 340 does not bypass the current from the secondary LEDs 320. As a result, the secondary LEDs 320 are illuminated.

In a low beam lighting mode, the mode switch controller 330 receives a low voltage from the secondary input 302 (this is in contrast with the electrical circuit 100 in which the low beam lighting mode was indicated by a high voltage from the secondary input 102). As a result, the base of the third transistor 633 receives a low voltage, causing the third transistor 633 to switch OFF. As there is no current flow through the third transistor 633, the current flowing in from terminal 4 flows through the eighth resistor 635 and the ninth resistor 637 to ground. The combination of the eighth resistor 635 and the ninth resistor 637 form a voltage divider, which results in a voltage drop across the eighth resistor 635 that is sufficient to switch ON the mode switch 340 connected to terminal 3. The switching ON of the mode switch 340 causes current to flow through the mode switch 340, thereby bypassing the secondary LEDs 320. As a result, the secondary LEDs 320 cease to illuminate, and only the primary LEDs 310 are illuminated.

Figure 8:
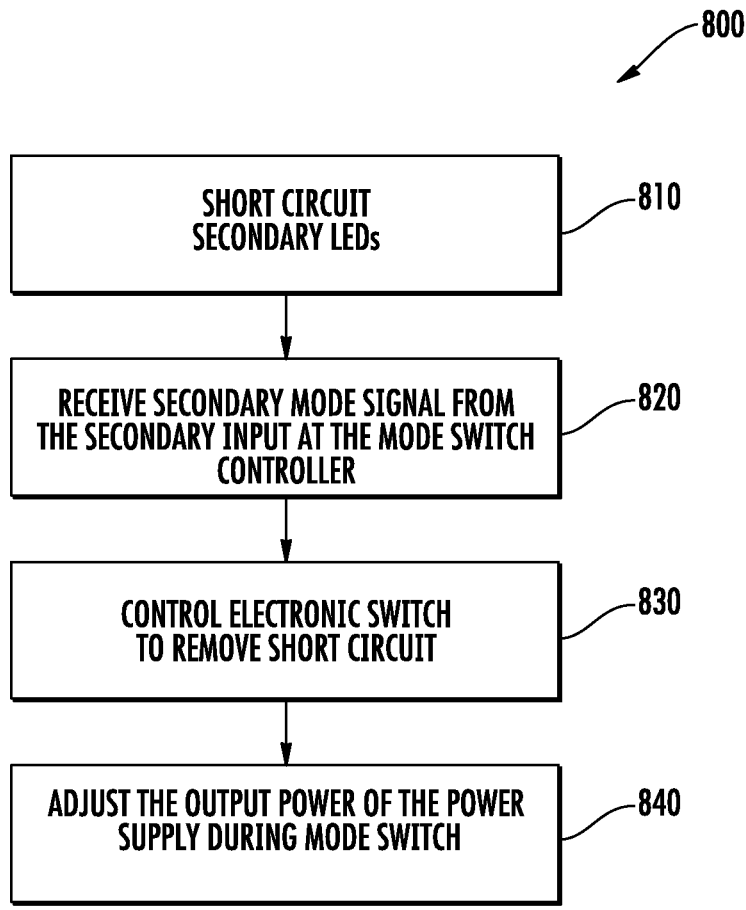
FIG. 8 is a flow diagram illustrating a method for controlling a vehicle lighting system according to one implementation.

Referring to FIG. 8, a method 800 for controlling a vehicle lighting system is shown according to another aspect of the present disclosure. The method 800 shown in FIG. 8 can be performed in accordance with any of the vehicle lighting systems of FIGS. 1-6. As shown in FIG. 8, the method 800 includes operating in a first mode or primary mode where the vehicle lighting system short circuits the secondary LEDs, allowing an electric current received from power supply to pass through only the primary LEDs (810). That is to say, a mode switch is operated to bypass or short circuit the secondary LEDs, such that only the primary LEDs are operated (e.g., in a primary or low beam lighting mode). The method 800 further includes receiving, by a mode switch controller, an electronic signal from a secondary input indicative of a secondary or high beam mode lighting function (820). In response to receiving the signal, the mode switch controller can control the mode switch (e.g., the gate of a MOSFET or BJT, etc.) to remove the short circuit across the secondary LEDs to allow the secondary LEDs to receive an electric current (830). In this way, both the primary and secondary LEDs can receive an electric current and can be operated in a secondary or high beam lighting mode. In some implementations, the method 800 can further include automatically adjusting the output power of the power supply to substantially zero in response to a change between modes, such as a change from a high beam lighting mode to a low beam lighting mode and vice versa (840).

Figure 9:
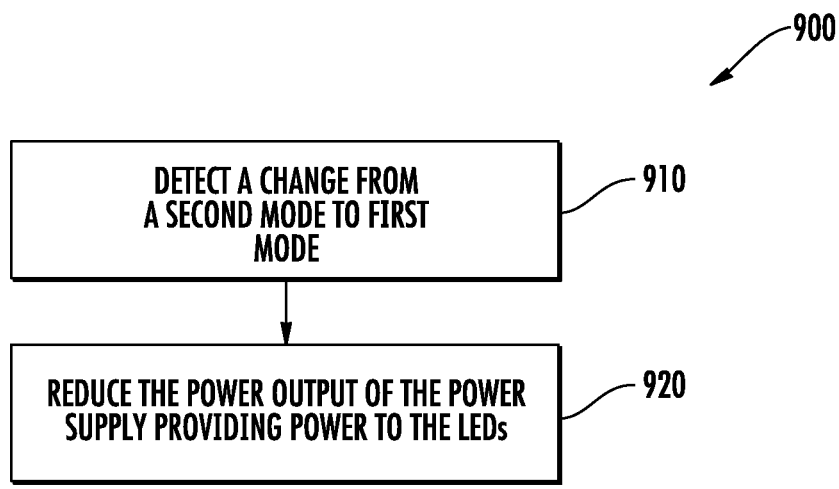
FIG. 9 is a flow diagram illustrating a method for reducing a voltage drop on an electronic switch in a vehicle lighting system when changing between lighting modes according to one implementation.

Referring to FIG. 9, a method 900 for reducing the power output of a power supply providing current to the LEDs during a change between lighting modes is shown according to one implementation. The method of FIG. 9 can be performed in accordance with any of the vehicle lighting systems of FIGS. 1-6. As shown in FIG. 9, the method 900 includes detecting a change from a second mode (e.g., a high beam lighting mode) to a first, primary mode (e.g., a low beam lighting mode) (910). In some implementations, detecting a change between lighting modes includes determining that a secondary input is no longer being received from a source (e.g., an electronic signal indicative of a secondary or high beam lighting mode). In some implementations, the method includes monitoring the system using a mode detection module. The method 900 can further include reducing the power output of the power supply in response to detecting a change between lighting modes (920). In some implementations, reducing the power output of the power supply can include reducing the current output by the power supply to zero, or close to zero, prior to switching modes.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Having described certain implementations, it will now become apparent to one of skill in the art that other implementations incorporating the concepts of the disclosure may be used. Therefore, the disclosure should not be limited to certain implementations, but rather should be limited only by the spirit and scope of the following claims.

What is claimed is:

1. A vehicle lighting system, comprising:
   a first LED;
   a second LED electrically connected in series with the first LED;
   a mode detection circuit electrically connected to each of the first and second LEDs;
   an electronic switch electrically connected to the mode detection circuit between the first and second LEDs, wherein the electronic switch is configured to short circuit the second LED in a primary mode and to remove the short circuit in a secondary mode;
   a signal generator electrically connected to the system so as to detect a change from the secondary mode to the primary mode; and
   a controller electrically connected to the signal generator;
   wherein the signal generator and the controller are configured to reduce a voltage drop on the electronic switch in response to detecting a change from the secondary mode to the primary mode; and
   wherein the mode detection circuit is configured to:
      control the electronic switch to short circuit the second LED in the first mode; and
      receive an input indicative of the secondary mode from a vehicle headlamp switch, and in response control the electronic switch to remove the short circuit.

2. The system of claim 1, wherein the primary mode is a low beam lighting function, and the secondary mode is a high beam lighting function.

3. The system of claim 1, wherein the input is an electronic signal sent from the vehicle headlamp switch to control a high beam lighting function, and wherein the electronic switch is at least one of a MOSFET or a BJT.

4. The system of claim 1, wherein the mode detection circuit includes a transistor configured to turn off the electronic switch to remove the short circuit in response to receiving the input.

5. The system of claim 1, wherein, during the primary mode, only the first LED is capable of receiving an electric current from a constant current source, and wherein, during the secondary mode, both the first and second LEDs are capable of receiving an electric current from the constant current source.

6. The system of claim 1, wherein the mode detection circuit is configured to automatically adjust an output voltage to maintain a desired output current delivered to the secondary and/or primary LEDs in response to a change between modes.

7. The system of claim 1, further comprising a current limiting element electrically connected in series with the electronic switch, and wherein the current limiting element is at least one of a resistor or an inductor.

8. The system of claim 1, wherein the signal generator is configured to reduce the voltage drop by generating a control signal to dim the first LED for a period of less than about 16.6 milliseconds.

9. The system of claim 8, wherein the signal generator is one of a PWM or an analog input.

10. A method for controlling a vehicle lighting system, comprising:
    providing the vehicle lighting system, wherein the vehicle lighting system comprises:
       a first LED electrically connected in series with a second LED,
       a mode detection circuit electrically connected to each of the first and second LEDs, and
       an electronic switch electrically connected to the mode detection circuit between the first and second LEDs;
    operating the electronic switch to short circuit the second LED in a first mode;
    receiving, by the mode detection circuit, an input from a source;
    operating, in response to receiving the input, the electronic switch to remove the short circuit to allow the second LED to receive an electric current in a second mode;
    detecting a change from the second mode to the first mode via a signal generator and a controller electrically connected to the system; and in response,
    reducing a voltage drop on the electronic switch.

11. The method of claim 10, wherein the first mode is a low beam lighting function, and the second mode is a high beam lighting function.

12. The method of claim 10, wherein the input is an electronic signal sent from a vehicle headlamp switch to control a high beam lighting function, and wherein the electronic switch is at least one of a MOSFET or a BJT.

13. The method of claim 10, wherein the mode detection circuit includes a transistor, and wherein operating the electronic switch to remove the short circuit includes turning off the electronic switch by operating the transistor.

14. The method of claim 10, wherein, during the first mode, only the first LED is capable of receiving an electric current from a constant current source, and wherein, during the second mode, both the first and second LEDs are capable of receiving an electric current from the constant current source.

15. The method of claim 10, further comprising automatically adjusting an output voltage from the mode detection circuit to maintain a desired output current to at least one of the secondary LED or the primary LED in response to a change between modes.

16. The method of claim 10, further comprising limiting an electric current flowing through the electronic switch during the first mode by a current limiting element, wherein the current limiting element is at least one of a resistor or an inductor.

17. The method of claim 10, wherein reducing the voltage drop includes generating a control signal to dim the first LED for a period of less than about 16.6 milliseconds.

18. The method of claim 17, wherein the signal generator is one of a PWM or an analog input.

\* \* \* \* \*